(12) United States Patent
Jackson (10) Patent No.: US 12,118,967 B2
(45) Date of Patent: Oct. 15, 2024

(54) CUSTOMIZABLE GUITAR STAND

(71) Applicant: Monroe Jackson, Jackson, MS (US)

(72) Inventor: Monroe Jackson, Jackson, MS (US)

(*) Notice: Subject to any disclaimer, the term of this patent is extended or adjusted under 35 U.S.C. 154(b) by 0 days.

(21) Appl. No.: 17/522,098

(22) Filed: Nov. 9, 2021

(65) Prior Publication Data

US 2023/0142421 A1  May 11, 2023

(51) Int. Cl.
*G10G 5/00* (2006.01)

(52) U.S. Cl.
CPC ..................... *G10G 5/00* (2013.01)

(58) Field of Classification Search
None
See application file for complete search history.

(56) References Cited

U.S. PATENT DOCUMENTS

| | | | |
|---|---|---|---|
| D295,705 S | 5/1988 | Cornelius | |
| D301,652 S | 6/1989 | Roberts | |
| D400,676 S | 11/1998 | Good | |
| D406,479 S | 3/1999 | Thorp et al. | |
| 5,876,050 A * | 3/1999 | Berger | B62B 3/006 |
| | | | 248/141 |
| D422,433 S | 4/2000 | Ho | |
| D451,024 S | 11/2001 | Glauth et al. | |
| D496,809 S | 10/2004 | Dardashti | |
| D499,281 S | 12/2004 | Yamaguchi | |
| D506,625 S | 6/2005 | Yamaguchi | |
| D650,611 S | 12/2011 | Melhart | |
| D713,178 S | 9/2014 | Cohen | |
| D723,308 S | 3/2015 | Franck et al. | |
| 10,239,547 B1 * | 3/2019 | Mohan | B62B 3/008 |
| D860,690 S | 9/2019 | Berry | |
| D920,722 S | 6/2021 | Li | |
| 2014/0284346 A1 * | 9/2014 | McCumber | B65D 43/162 |
| | | | 220/792 |
| 2017/0156486 A1 * | 6/2017 | Blick | B60B 33/0026 |
| 2018/0086358 A1 * | 3/2018 | Bacallao | B62B 3/005 |
| 2020/0039553 A1 * | 2/2020 | Abohammdan | B62B 5/061 |
| 2020/0172138 A1 * | 6/2020 | Tolson | B62B 3/104 |

(Continued)

FOREIGN PATENT DOCUMENTS

| | | |
|---|---|---|
| CN | 302947394 | 9/2014 |
| CN | 304142972 | 5/2017 |
| CN | 304955423 | 12/2018 |

(Continued)

OTHER PUBLICATIONS

Marco, Mobile Instrument Racks; https://www.arcat.com/product/Mobile-Instrument-Racks-202278, pp. 1-5, accessed on Mar. 7, 2022.

(Continued)

*Primary Examiner* — Steven M Marsh
(74) *Attorney, Agent, or Firm* — Bradley Arant Boult Cummings LLP; Michael Casey Williams; Jessica L. Zurlo (57) ABSTRACT

A customizable stand for storing and displaying musical instruments, such as guitars, is disclosed. The customizable stand includes a rectangular frame having four vertical posts and a plurality of horizontal supports with at least one shelf extending transversely within the frame and supported by the four vertical posts. The customizable stand may also include a music box and a plurality of wheels attached to the frame.

16 Claims, 4 Drawing Sheets

(56) References Cited

U.S. PATENT DOCUMENTS

2021/0024111 A1* 1/2021 Chiao .................... A47B 31/00
2022/0306172 A1* 9/2022 Zesch .................... B62B 3/025

FOREIGN PATENT DOCUMENTS

| CN | 305153108 | 5/2019 |
| CN | 305993588 | 8/2020 |
| CN | 306213787 | 12/2020 |
| CN | 306466673 | 4/2021 |
| CN | 306481015 | 4/2021 |
| JP | D1509498 | 9/2014 |
| JP | D1674320 | 11/2020 |
| JP | D1674336 | 11/2020 |
| JP | D1674363 | 11/2020 |
| KR | 300302840 | 7/2002 |
| KR | 300706906 | 8/2013 |
| KR | 300739846 | 4/2014 |
| KR | 300883008 | 11/2016 |
| KR | 300918887 | 8/2017 |
| KR | 300944578 | 2/2018 |
| KR | 2067924 B1 * | 1/2020 ............. B62B 3/005 |
| KR | 301078304 | 10/2020 |
| KR | 301082766 | 11/2020 |

OTHER PUBLICATIONS

Porter-Cable PCSRW4800 Customizable Shop Workbench/Garage Storage Rack Combo Set; https://www.shopyourway.com/porter-cable-pcsrw4800-customizable-shop-workbench-garage-storage-rack-combo-set/732599948, pp. 1-2, published on Aug. 20, 2019.
Bakeey Kitchen Storage Rack Telescopic Shelf Simple Double-layer Space-saving Stove Top Rack Microwave Storage Rack; https://24loop.com/shop/bakeey-kitchen-storage-rack-telescopic-shelf-simple-double-layer-space-saving-stove-top-rack-microwave-storage-rack/; pp. 1-9, accessed on Mar. 7, 2022.
Husky 1000 Series 39-inch W×72-inch H×18.5-inch D Steel 4-Shelf Customizable Shelving Unit; https://www.homedepot.ca/product/husky-1000-series-39-inch-w-x-72-inch-h-x-18-5-inch-d-steel-4-shelf-customizable-shelving-unit-in-black/1001115437; pp. 1-5, accessed on Mar. 7, 2022.
Omega Products on Instagram: Customizable mobile wire shelving to suit a variety of storage needs; https://fi.pinterest.com/pin/818599669749013600/; pp. 1-2, accessed on Mar. 7, 2022.

* cited by examiner

CUSTOMIZABLE GUITAR STAND

TECHNICAL FIELD

The present disclosure relates generally to instrument stands, and more particularly to customizable guitar stands for displaying and storing guitars and guitar cases.

BACKGROUND

The guitar is a common musical instrument that is often played for professional performances or entertainment. The guitar player holds the guitar while playing it, but once the performance is over, the guitar must then be stored away. A traditional guitar stand, one that only allows the guitar player to store his instrument outside of the protective casing, subjects the guitar to unnecessary damages. Additionally, laying the guitar flat on the ground or leaning the guitar up against a wall may result in damage to the guitar, such as damage to the sound box or strings. Alternatively, other guitar stands, ones that allow the storage of the guitar case, are improperly designed to allow the artist to display his or her instrument. Thus, once the guitar is in a case, the musician needs to be able to store the case while also maintaining the ability to display the aesthetic nature of the instrument—especially if it is a vintage or custom guitar. Accordingly, there remains a need in the art for a stand that can be used to store guitars and display the guitars in their cases.

SUMMARY

The problems expounded above, as well as others, are addressed by the following inventions, although it is to be understood that not every embodiment of the inventions described herein will address each of the problems described above. The present disclosure provides a customizable instrument stand that can be used to display and store instruments, such as guitars and guitar cases.

In some embodiments, a stand for storing and displaying an instrument is provided, the stand includes a rectangular frame including four vertical posts, four upper horizontal supports, and four lower horizontal supports, where the vertical posts are connected to each of the four upper horizontal supports and the four lower horizontal supports, a shelf extending transversely within the frame and supported by the four vertical posts, where the shelf includes two sidewalls extending along its width and a back wall extending along its length, a music box attached to the rectangular frame at a height approximately level with the shelf, and a plurality of wheels attached to the frame. In this embodiment, the two sidewalls and the back wall may have a height of about 1 inch to about 5 inches. In further embodiments, the music box includes a lid having an overlapping lip. In still further embodiments, the frame has a length of about 40 inches to about 55 inches. In yet further embodiments, the frame has a width of about 12 inches to about 20 inches.

In other embodiments, a stand for storing and displaying an instrument is provided, the stand including a frame including four vertical posts, four upper horizontal supports, and four lower horizontal supports, where the vertical posts are connected to each of the four upper horizontal supports and four lower horizontal supports, a shelf extending transversely within the frame and supported by the four vertical posts, where the shelf includes two sidewalls extending along its width and a back wall extending along its length, a music box attached to the rectangular frame at a height approximately level with the shelf, where the music box includes a lid attached thereto by a hinge, a plurality of wheels attached to the frame, and where the stand has a length of about 43 inches to about 48 inches and a height of about 40 inches to about 43 inches. In this embodiment, the two sidewalls and the back wall may have a height of about 1 inch to about 3 inches. In further embodiments, the shelf is positioned at a height of about 15 inches to about 30 inches on the frame. In still further embodiments, the lid has an overlapping lid for ease of access. In yet further embodiments, the frame has a width of about 14 inches to about 18 inches.

In still other embodiments, a stand for storing and displaying an instrument is provided, the stand includes a rectangular frame including four vertical posts and a plurality of horizontal supports, at least three shelves extending transversely within the frame and supported by the four vertical posts, where each of the shelves includes two sidewalls extending along its width and a back wall extending along its length, and where each of the shelves are spaced in a parallel relationship with one another with a height of at least 12 inches therebetween, a music box attached to the rectangular frame at a height approximately level with one of the at least three shelves, and a plurality of wheels attached to the frame. In this embodiment, each of the shelves are spaced in a parallel relationship with one another with a height of at least 15 inches therebetween. In further embodiments, the stand includes one or more hooks attached to the vertical posts. In still further embodiments, the frame has a height of about 50 inches to about 80 inches. In yet further embodiments, the frame has a height of about 55 inches to about 70 inches.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

Figure 1:
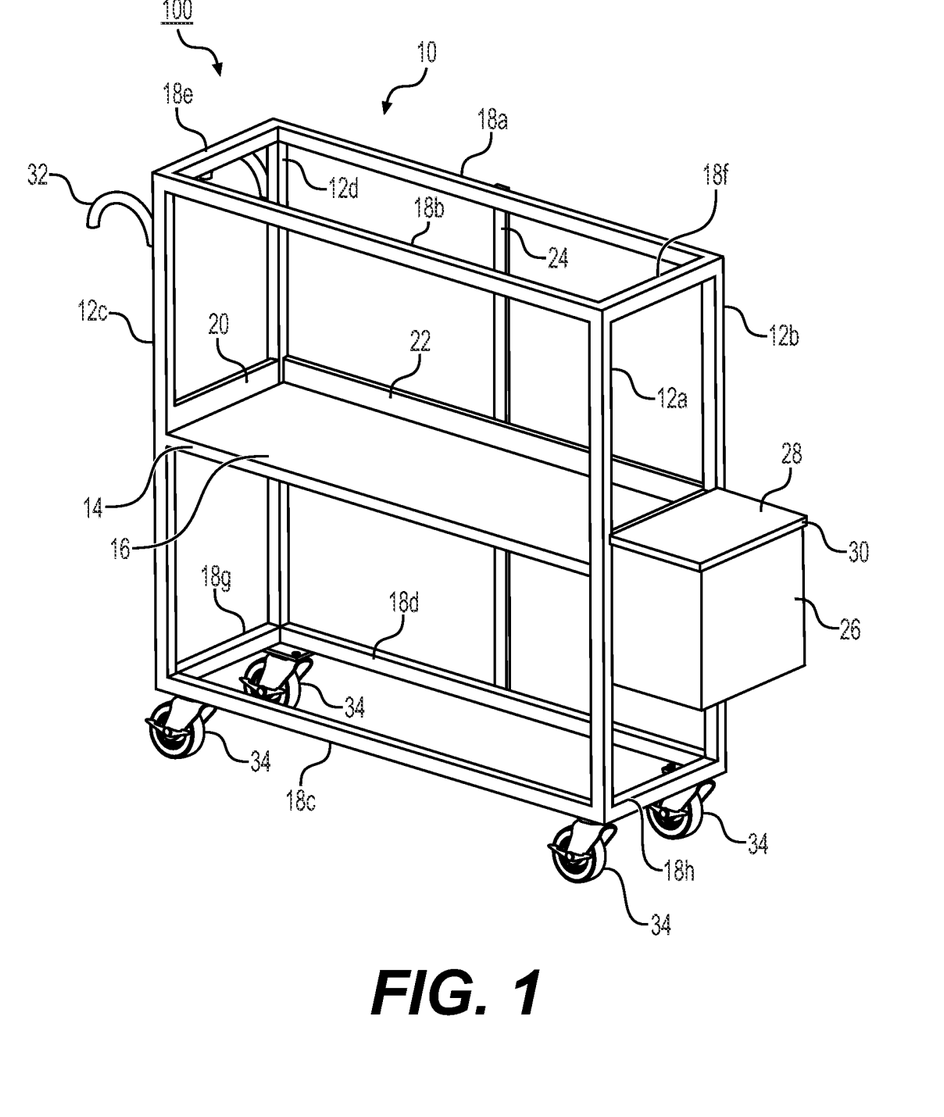
FIG. 1 is a front perspective view of a guitar stand according to one embodiment of the present disclosure.
Figure 2:
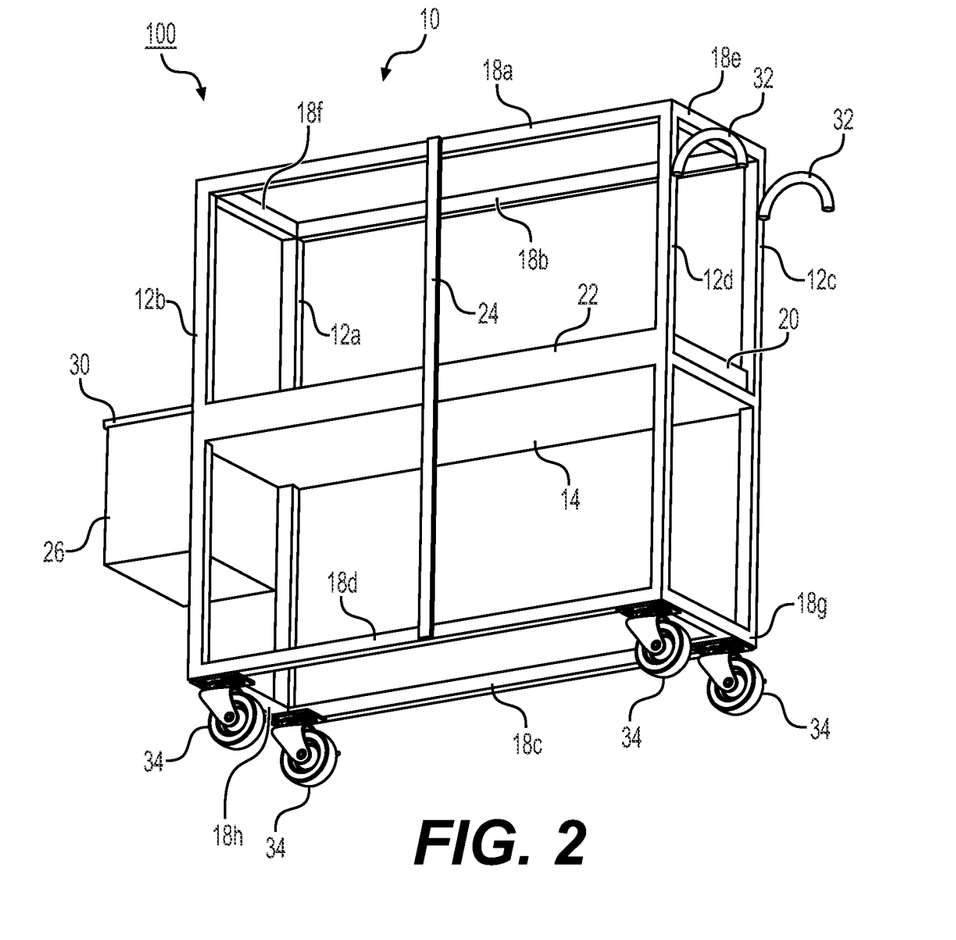
FIG. 2 is a rear perspective view of the guitar stand shown in FIG. 1.

Referring to FIGS. 1 and 2, a guitar stand 100 according to an exemplary embodiment of the present disclosure is shown. The guitar stand 100 may be used to store a guitar case and display the guitar within the case. While the present disclosure is shown for use with a guitar, it should be understood that the present disclosure may be adapted for any stringed musical instrument, such as a violin, viola, harp, cello, or banjo, and may be adapted, in general, to any type of musical instrument, whether stringed or not, where the musician desires to display and store the case for the musical instrument.

The guitar stand 100 includes a frame 10 having a plurality of vertical posts 12a-12d and horizontal supports 18a-18d that form an outer structure of the guitar stand 100. As shown in FIGS. 1 and 2, there are four vertical posts 12a, 12b, 12c, and 12d and eight horizontal supports 18a, 18b, 18c, 18d, 18e, 18f, 18g, and 18h such that the frame 10 has a rectangular shape. Vertical posts 12a and 12b are operatively connected to each other by horizontal posts 18f and 18h. Vertical posts 12c and 12d are operatively connected to each other by horizontal posts 18e and 18g. Vertical posts 12a and 12c are operatively connected to each other by horizontal posts 18b and 18c. Vertical posts 12b and 12d are operatively connected to each other by horizontal posts 18a and 18d. The frame 10 may also include a support bar 24 located at the back of the guitar stand 100 that extends from the horizontal support 18a to the horizontal support 18d. While the frame 10 is shown as rectangular, those of ordinary skill in the art will appreciate that the frame 10 may have any other shape, such as a square shape, that allows for a guitar case to be displayed.

The frame 10 supports a shelf 14 that can be used to store and display a guitar case. The shelf 14 is formed within the frame 10 and is supported by each of the vertical posts 12a-12d. In the illustrated embodiment, the shelf 14 is formed in the center of the frame 10. However, the shelf 14 may be formed within the frame 10 at any height desired by the user. The shelf 14 includes a top surface 16 for placement of the guitar case. The shelf 14 may have sidewalls 20 and a back wall 22, as shown in FIGS. 1 and 2, to prevent the guitar case from falling off the stand 100. The sidewalls 20 and back wall 22 should be of a sufficient height to prevent items from falling off the edges of the guitar stand 100. In one embodiment, the sidewalls 20 and back wall 22 have a height of about 1 inch to about 5 inches, preferably about 2 inches. The sidewalls 20 and back wall 22 may be rectangular upturned lips that are integrally formed with the shelf 14. In other embodiments, the sidewalls 20 and back wall 22 may be designed as separate pieces that are attached to the shelf 14.

The shelf 14 may have any thickness that allows for the shelf 14 to hold the weight of the guitar case. For example, the shelf 14 may have a thickness of about 2 inches to about 5 inches, preferably about 3 inches. The shelf 14 may have a polygonal shape although the shape of the shelf 14 can be curved or have a combination of curved and straight edges. In a preferred embodiment, the shelf 14 is rectangular. The shelf 14 may be attached to the frame 10 by any suitable securing means, such as, for example, by screws, pins, nails, bolts, or brackets.

The guitar stand 100 may further include a music box 26. As shown in FIGS. 1 and 2, the music box 26 is attached to the frame 10 in between vertical posts 12a and 12b. The music box 26 provides a space to store sheets of music or any other items useful for playing the displayed instrument. In the illustrated embodiment, a lid 28 is attached to the music box 26, which protects the sheets of music and other stored materials. The lid 28 has an overlapping lip 30 that allows for ease of opening the lid 28. In some embodiments, the lid 28 is secured to the music box 26 (but may still be opened and closed). For example, the lid 28 may be attached to the music box 26 by a hinged mechanism, such as a piano hinge, surface-mount hinge, butt hinge, side-rail hinge, quadrant hinge, barbed hinge, or barrel hinge. In other embodiments, the lid 28 may be completely removable such that the lid 28 can be detached from the music box 26 and set aside until further use.

In the illustrated embodiment, the music box 26 is attached to the frame 10 in between vertical posts 12a and 12b at a height equivalent to the height of the shelf 14. However, the music box 26 may be positioned at any location on the frame 10 that allows for the user to readily access the contents of the music box 26. For example, the music box 26 may be positioned on the side opposite of that shown in FIG. 1, such as between vertical posts 12c and 12d at a height equivalent to the height of the shelf 14. In other embodiments, the music box 26 may be positioned on the back side of the guitar stand 100, such as on the horizontal support 18a. In still other embodiments, the music box 26 may be attached to the frame 10 at a height higher than the height illustrated in FIGS. 1 and 2. For instance, the music box 26 may be attached at horizontal support 18f or 18e.

In some embodiments, the guitar stand 100 may include one or more hooks 32 for hanging certain objects. As shown in FIGS. 1 and 2, two hooks 32 are attached to each of the vertical posts 12c and 12d, respectively. The hooks 32 are positioned proximate to the top of the guitar stand 100. The hooks 32 are formed as having an inverted U-shape. However, the hooks 32 may have any curved shape known to those of ordinary skill in the art.

In further embodiments, the guitar stand 100 is movable such that the user can move the stand 100 to different locations. As illustrated, the guitar stand 100 may include a plurality of wheels 34 for ease of mobility. The guitar stand 100 may have four wheels 34, where each wheel 34 is attached to a bottom corner of the frame 10. Though any other configuration and number of wheels may be utilized with the guitar stand 100. The wheels 34 may include a locking mechanism, such as a brake, to prevent the guitar stand 100 from sliding or moving once it is positioned in the desired location. In still other embodiments, the guitar stand 100 may be stationary and not readily movable.

The guitar stand 100 (and the shelf 14 formed therein) may have any dimension that allows for the desired guitar case to be displayed on the stand 100. In some embodiments, the guitar stand 100 may have a length of about 40 inches to about 55 inches. In another embodiment, the guitar stand 100 may have a length of about 42 inches to about 50 inches. In still another embodiment, the guitar stand 100 may have a length of about 43 inches to about 48 inches. For example, the guitar stand 100 may have a length of about 44 inches, preferably 44.5 inches. In some embodiments, the guitar stand 100 may have a width of about 10 inches to about 25 inches. In another embodiment, the guitar stand 100 may have a width of about 12 inches to about 20 inches. In still another embodiment, the guitar stand 100 may have a width of about 14 inches to about 18 inches. For instance, the guitar stand 100 may have a width of about 15 inches, preferably 15.25 inches. The guitar stand 100 may have a height of about 35 inches to about 50 inches. In some embodiments, the guitar stand 100 may have a height of about 38 inches to about 45 inches. In further embodiments, the guitar stand 100 may have a height of about 40 inches to about 43 inches. For example, the guitar stand 100 may have a height of about 42 inches.

In some embodiments, the shelf 14 may be placed at any height on the frame 10 that allows for sufficient clearance between the shelf 14 and the top horizontal supports 18a and 18b for the desired guitar case to be displayed. In one embodiment, the shelf 14 is positioned at a height of about 15 inches to about 30 inches above the horizontal supports 18c and 18d. In another embodiment, the shelf 14 may be positioned at a height of about 18 inches to about 25 inches above the horizontal supports 18c and 18d. In still another embodiment, the shelf 14 may be positioned at a height of about 20 inches to about 23 inches above the horizontal supports 18c and 18d. For instance, the shelf 14 may be positioned at a height of about 23 inches above the horizontal supports 18c and 18d.

The music box 26 may be attached to the frame 10 at the same height as the shelf 14, as illustrated in FIGS. 1 and 2. In other embodiments, the music box 26 may be positioned below or above the shelf 14. The hooks 32 may be positioned above the shelf 14, as shown in FIGS. 1 and 2. For example, the hooks 32 may be positioned at a height of about 30 inches to about 40 inches above the horizontal supports 18c and 18d, preferably about 34 inches to about 36 inches above the horizontal supports 18c and 18d, and more preferably about 35 inches above the horizontal supports 18c and 18d.

Figure 3:
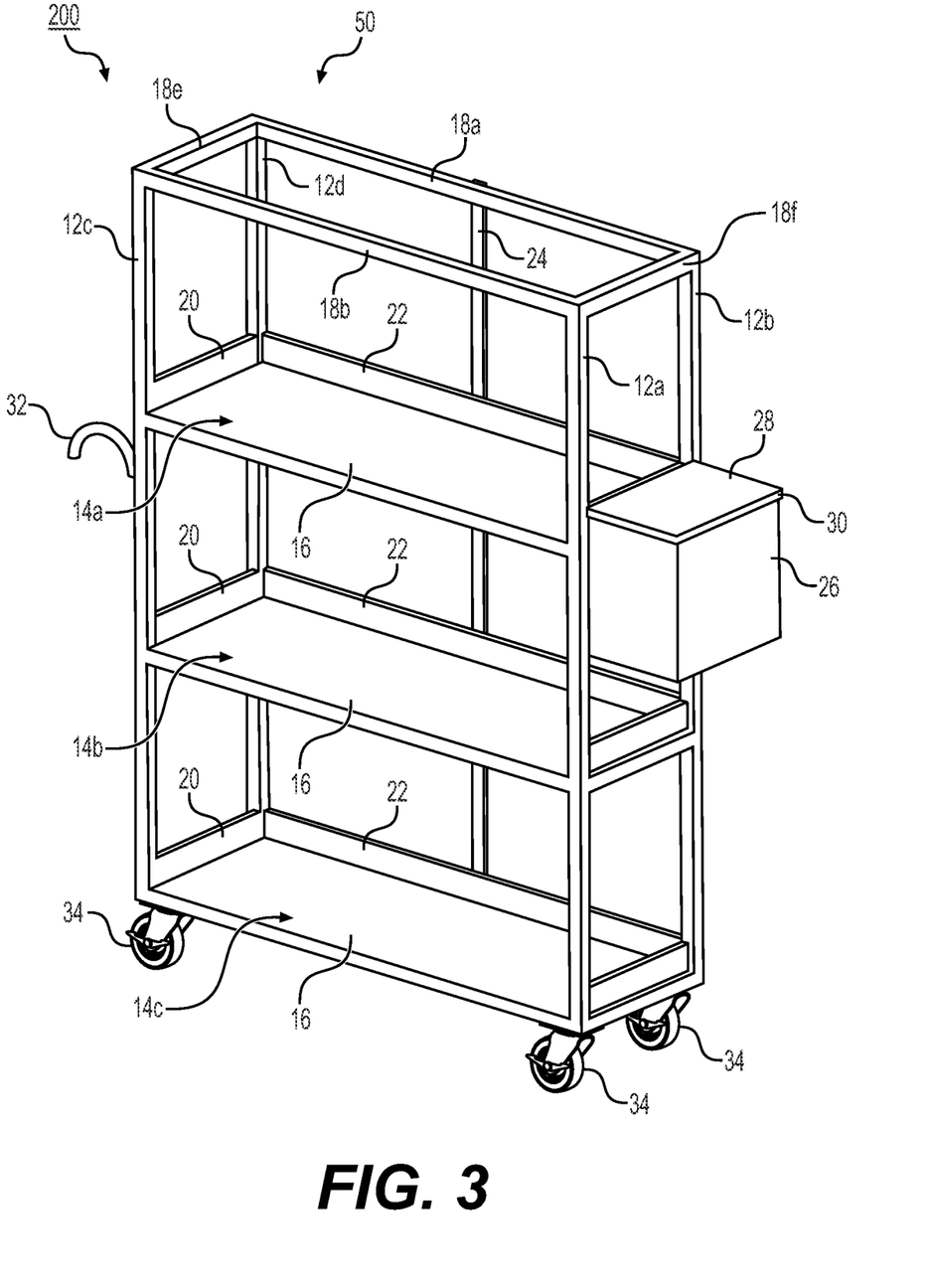
FIG. 3 is a front perspective view of a guitar stand according to another embodiment of the present disclosure.
Figure 4:
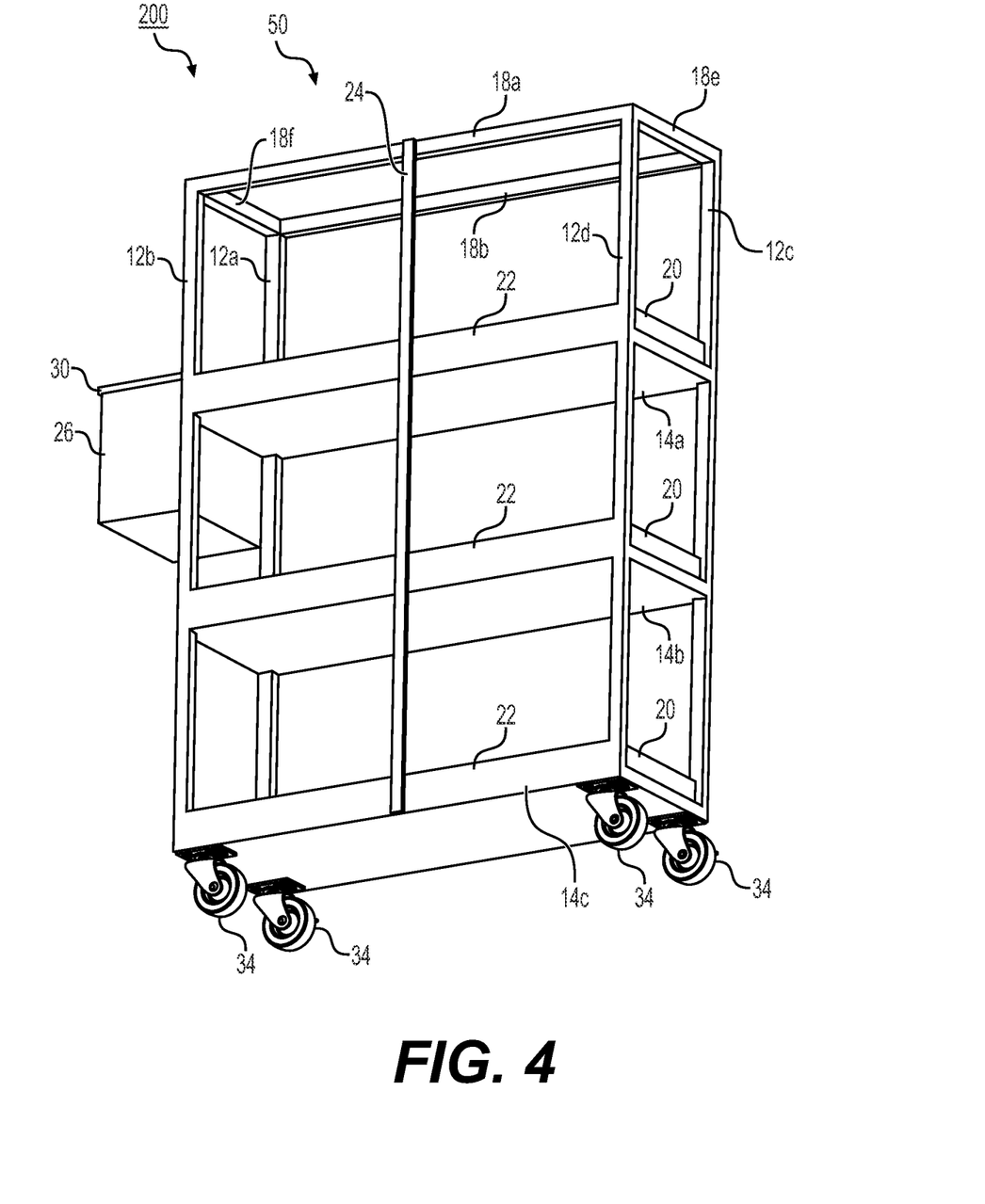
FIG. 4 is a rear perspective view of the guitar stand shown in FIG. 3.

FIGS. 3 and 4 show a guitar stand 200 according to another embodiment of the present disclosure. In the illustrated embodiment, the guitar stand 200 includes three shelves for storing and displaying three instruments, such as three guitars. However, as explained above, the guitar stands described herein are completely customizable and may include any number of shelves depending on the number of desired instruments to be stored and displayed.

The guitar stand 200 includes the frame 50 having the plurality of vertical posts 12a-12d and horizontal supports 18a, 18b, 18e, and 18f The frame 50 supports three shelves: a first shelf 14a, a second shelf 14b, and a third shelf 14c that can each be used to store and display a guitar case. The shelves 14a, 14b, and 14c are formed within the frame 50 and are supported by each of the vertical posts 12a-12d. The frame 50 may also include the support bar 24 located at the back of the guitar stand 200 that extends from the horizontal support 18a to the bottom shelf 14c.

In the illustrated embodiment, the third shelf 14c is positioned at the bottom of the frame 50, while the first shelf 14a and the second shelf 14b are formed above the third shelf 14c at varying heights. The shelves 14a, 14b, and 14c, however, may be arranged in any configuration and may be formed at varying heights within the frame 50. For example, any of the shelves 14a, 14b, and 14c may be formed at the top of the frame 50 with the other shelves positioned below at varying heights. Each of the shelves 14a, 14b, and 14c includes the top surface 16 for placement of the guitar case. Each of the shelves 14a, 14b, and 14c may have the sidewalls 20 and back wall 22, as described above, to prevent the guitar case from falling off of the stand 200.

Similar to the embodiment shown in FIGS. 1 and 2, the guitar stand 200 may include the music box 26 attached thereto. As shown in FIGS. 3 and 4, the music box 26 is attached to the frame 50 in between vertical posts 12a and 12b. In the illustrated embodiment, the music box 26 is attached to the frame 50 in between vertical posts 12a and 12b at a height equivalent to the height of the first shelf 14a. However, the music box 26 may be positioned at any location on the frame 50 that allows for the user to readily access the contents of the music box 26. For example, the music box 26 may be positioned at a height equivalent to the height of the second shelf 14b or at a height equivalent to the height of the third shelf 14c. In still other embodiments, the music box 26 may be attached to the frame 50 on the side opposite of that shown in FIGS. 3 and 4. For instance, the music box 26 may be attached to the frame 50 in between vertical posts 12c and 12d at varying heights. In further embodiments, the music box 26 may be positioned on the back side of the guitar stand 200, such as on the horizontal support 18a.

In some embodiments, the guitar stand 200 may include the hooks 32 described above. As shown in FIGS. 3 and 4, two hooks 32 are attached to each of the vertical posts 12c and 12d, respectively, at a height in between the first shelf 14a and the second shelf 14b. Though the hooks 32 may also be positioned higher on the stand 200, such as above the first shelf 14a. In other embodiments, the guitar stand 200 may include the plurality of wheels 34 for ease of mobility.

The guitar stand 200 (and the shelves 14a, 14b, and 14c formed therein) may have any dimension that allows for the desired guitar cases to be displayed on the stand 200. The guitar stand 200 may have any of the length and width dimensions discussed above with respect to the embodiment shown in FIGS. 1 and 2. Because the guitar stand 200 includes three shelves, the guitar stand 200 may have a greater height than the embodiment shown in FIGS. 1 and 2. In some embodiments, the guitar stand 200 has a height of about 50 inches to about 80 inches. In another embodiment, the guitar stand 200 may have a height of about 55 inches to about 70 inches. In still another embodiment, the guitar stand 200 may have a height of about 58 inches to about 65 inches. For example, the guitar stand 200 may have a height of about 60 inches.

The shelves 14a, 14b, and 14c may be placed at any height on the frame 50 that allows for sufficient clearance between the shelves 14a, 14b, and 14c for the desired guitar case to be displayed. In one embodiment, the first shelf 14a may be positioned at a height of about 35 inches to about 50 inches above the third shelf 14c. In another embodiment, the first shelf 14a may be positioned at a height of about 38 inches to about 45 inches above the third shelf 14c. In still another embodiment, the first shelf 14a may be positioned at a height of about 40 inches to about 43 inches above the third shelf 14c. The remaining shelves, i.e., the second shelf 14b and the third shelf 14c, may be attached to the frame 50 below the first shelf 14a at varying heights. In one embodiment, the clearance between each shelf 14a, 14b, and 14c should be at least about 12 inches. In other embodiments, the clearance between each shelf 14a, 14b, and 14c should be at least about 15 inches. In still other embodiments, the clearance between each shelf 14a, 14b, and 14c should be at least about 18 inches. For example, the clearance between each shelf 14a, 14b, and 14c should be at least about 19 inches, preferably at least about 20 inches.

The music box 26 may be attached to the frame 50 at the same height as the first shelf 14a, as illustrated in FIGS. 3 and 4. In other embodiments, the music box 26 may be positioned below the first shelf 14a, for instance, at the height of the second shelf 14b. The hooks 32 may be positioned above or below the first shelf 14a. In the illustrated embodiment, the hooks 32 are positioned below the first shelf 14a. For example, the hooks 32 may be positioned at a height of about 30 inches to about 40 inches, preferably about 34 inches to about 36 inches, and more preferably about 35 inches.

The guitar stands described herein may be constructed or manufactured from any material that is sufficiently durable to support the weight of instruments and their cases. In some embodiments, the guitar stands are constructed or manufactured from various polymers, plastics, stainless steel, aluminum, or wood. Similarly, the guitar stands described herein may be constructed according to various manufacturing methods including injection molding, milling, forging, extrusion, pressing, and other related manufacturing methods.

The foregoing description illustrates and describes the processes, manufactures, compositions of matter, and other teachings of the present disclosure. Additionally, the disclosure shows and describes only certain embodiments of the processes, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, manufactures, compositions of matter, and other teachings of the present disclosure and to enable others skilled in the art to utilize the teachings of the present disclosure in such, or other, embodiments and with the various modifications required by the particular applications or uses. Accordingly, the processes, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A stand for storing and displaying an instrument, comprising:
    a rectangular frame consisting of four vertical posts, four upper horizontal supports, four lower horizontal supports, and a vertical support bar, wherein the vertical posts are connected to each of the four upper horizontal supports and the four lower horizontal supports, and wherein the vertical support bar extends from an upper horizontal support to a lower horizontal support and the vertical support bar is substantially centered along a rear of the rectangular frame,
    a top shelf and a bottom shelf extending transversely within the frame and supported by the four vertical posts, wherein each of the top shelf and the bottom shelf includes two sidewalls extending along its width and a back wall extending along its length and the four upper horizontal supports form an open frame above the top shelf,
    a music box attached to two adjacent vertical posts of the rectangular frame and facing outwardly therefrom, wherein the music box is attached at a height approximately level with the top shelf, and wherein the music box comprises a lid attached thereto by a hinge and the lid is configured to pivot about the hinge in an upward direction to an open position and in a downward direction to a closed position, and
    a plurality of wheels attached to the frame.

2. The stand of claim 1, wherein the two sidewalls and the back wall have a height of about 1 inch to about 5 inches.

3. The stand of claim 1, wherein the lid has an overlapping lip.

4. The stand of claim 1, wherein the frame has a length of about 40 inches to about 55 inches.

5. The stand of claim 1, wherein the frame has a width of about 12 inches to about 20 inches.

6. A stand for storing and displaying an instrument, comprising:
    a frame consisting of four vertical posts, four upper horizontal supports, four lower horizontal supports, and a vertical support bar, wherein the vertical posts are connected to each of the four upper horizontal supports and four lower horizontal supports, and wherein the vertical support bar extends from an upper horizontal support to a lower horizontal support and the vertical support bar is substantially centered along a rear of the rectangular frame,
    a top shelf and a bottom shelf extending transversely within the frame and supported by the four vertical posts, wherein each of the top shelf and the bottom shelf includes two sidewalls extending along its width and a back wall extending along its length and the four upper horizontal supports form an open frame above the top shelf,
    a music box attached to two adjacent vertical posts of the rectangular frame and facing outwardly therefrom, wherein the music box is attached at a height approximately level with the top shelf, and wherein the music box comprises a lid attached thereto by a piano hinge and the lid is configured to pivot about the piano hinge in an upward direction to an open position and in a downward direction to a closed position, and
    at least four wheels attached to a base of the frame.

7. The stand of claim 6, wherein the two sidewalls and the back wall have a height of about 1 inch to about 3 inches.

8. The stand of claim 6, wherein the top shelf is positioned at a height of about 15 inches to about 30 inches on the frame.

9. The stand of claim 6, wherein the lid has an overlapping lip for ease of access.

10. The stand of claim 6, wherein the frame has a width of about 14 inches to about 18 inches.

11. A stand for storing and displaying an instrument, comprising:
- a rectangular frame consisting of four vertical posts, four upper horizontal supports, four lower horizontal supports, and a vertical support bar, wherein the vertical support bar extends from an upper horizontal support to a lower horizontal support and the vertical support bar is substantially centered along a rear of the rectangular frame,
- a top shelf and at least two lower shelves, wherein the shelves extend transversely within the frame and are supported by the four vertical posts, wherein each of the shelves includes two sidewalls extending along its width and a back wall extending along its length and each of the shelves are spaced in a parallel relationship with one another, and wherein the four upper horizontal supports form an open frame above the top shelf,
- a music box attached to two adjacent vertical posts of the rectangular frame and facing outwardly therefrom, wherein the music box is attached at a height approximately level with the top shelf, and wherein the music box comprises a lid attached thereto by a piano hinge and the lid is configured to pivot about the piano hinge in an upward direction to an open position and in a downward direction to a closed position,
- a plurality of wheels attached to the frame.

12. The stand of claim 11, wherein each of the shelves are spaced in a parallel relationship with one another with a height of at least 12 inches therebetween.

13. The stand of claim 11, further comprising one or more hooks attached to the vertical posts.

14. The stand of claim 11, wherein the frame has a height of about 50 inches to about 80 inches.

15. The stand of claim 11, wherein the frame has a height of about 55 inches to about 70 inches.

16. The stand of claim 1, wherein each of the two sidewalls and the back wall partially enclose the top shelf and the bottom shelf.

* * * * *